US009488532B2

(12) United States Patent
Kasajima et al.

(10) Patent No.: US 9,488,532 B2
(45) Date of Patent: Nov. 8, 2016

(54) TEMPERATURE DISTRIBUTION MEASUREMENT SYSTEM, TEMPERATURE DISTRIBUTION MEASUREMENT APPARATUS, AND TEMPERATURE DISTRIBUTION MEASUREMENT METHOD

(71) Applicant: FUJITSU LIMITED, Kawasaki-shi, Kanagawa (JP)

(72) Inventors: Takeo Kasajima, Machida (JP); Kazushi Uno, Atsugi (JP); Minoru Ishinabe, Atsugi (JP); Kyoko Tadaki, Atsugi (JP); Fumio Takei, Isehara (JP)

(73) Assignee: FUJITSU LIMITED, Kawasaki (JP)

( * ) Notice: Subject to any disclaimer, the term of this patent is extended or adjusted under 35 U.S.C. 154(b) by 281 days.

(21) Appl. No.: 14/173,465

(22) Filed: Feb. 5, 2014

(65) Prior Publication Data

US 2014/0153611 A1   Jun. 5, 2014

Related U.S. Application Data

(63) Continuation of application No. PCT/JP2011/069711, filed on Aug. 31, 2011.

(51) Int. Cl.
*G01K 3/00* (2006.01)
*G01K 11/00* (2006.01)
*G01K 15/00* (2006.01)
*G01K 11/32* (2006.01)

(52) U.S. Cl.
CPC .............. *G01K 11/32* (2013.01); *G01K 15/00* (2013.01)

(58) Field of Classification Search
USPC ..................... 374/161, 1, 124, 137
See application file for complete search history.

(56) References Cited

U.S. PATENT DOCUMENTS

| 5,113,277 | A | * | 5/1992 | Ozawa | G01K 11/32 374/E11.015 |
| 5,639,162 | A | * | 6/1997 | Sai | G01K 11/32 250/227.18 |
| 5,991,479 | A | * | 11/1999 | Kleinerman | G01J 5/08 250/227.11 |

(Continued)

FOREIGN PATENT DOCUMENTS

| JP | 4-50624 | 2/1992 |
| JP | 5-172656 | 7/1993 |
| JP | 2009-265077 | 11/2009 |

(Continued)

OTHER PUBLICATIONS

Translation of JP 2009265077 (Nov. 12, 2009).*

(Continued)

*Primary Examiner* — Mirellys Jagan
(74) *Attorney, Agent, or Firm* — Fujitsu Patent Center

(57) ABSTRACT

A temperature distribution measurement system includes an optical fiber, a laser light source optically connected to the optical fiber, a photodetector configured to detect light backscattered in the optical fiber, and a temperature distribution measurement unit configured to perform correction calculation using a transfer function on a measured temperature distribution obtained from an output from the photodetector. The temperature distribution measurement unit acquires an actual temperature distribution in a location where the optical fiber is laid and determines appropriateness of the transfer function by computing a difference between the measured temperature distribution after the correction and the actual temperature distribution.

12 Claims, 11 Drawing Sheets

(56) References Cited

U.S. PATENT DOCUMENTS 8,699,009 B2* 4/2014 Li .................... G01B 11/18
356/33
2012/0033709 A1 2/2012 Kasajima et al.

FOREIGN PATENT DOCUMENTS

| JP | 2010-107279 | 5/2010 |
|----|----|----|
| JP | 2010-160081 | 7/2010 |
| WO | 2010/125712 A1 | 11/2010 |

OTHER PUBLICATIONS

Translation of WO 2010125712 (Nov. 4, 2010).*

CNOA—Office Action of Chinese Patent Application No. 201180073111.X dated Oct. 31, 2014, with full English Translation of the Office Action.
JPOA—Office Action of Japanese Patent Application No. 2013-530949 dated Dec. 2, 2014, with English Translation of relevant part, p. 1, line 26 to p. 3, line 2, of the Office Action.
International Search Report,,International Search Report, mailed in connection with PCT/JP2011/069711 and mailed Oct. 11, 2011.
EESR,,Search Report of EuropeanPatent Application 11871413.8 dated Feb. 13, 2015.
JPOA—Office Action of Japanese Patent Application No. 2013-530949 dated May 19, 2015, with partial English translation of the Office Action.
CNOA—Office Action of China Patent Application No. 201180073111.X dated Jun. 30, 2015 with English Translation.

* cited by examiner

FIG. 4
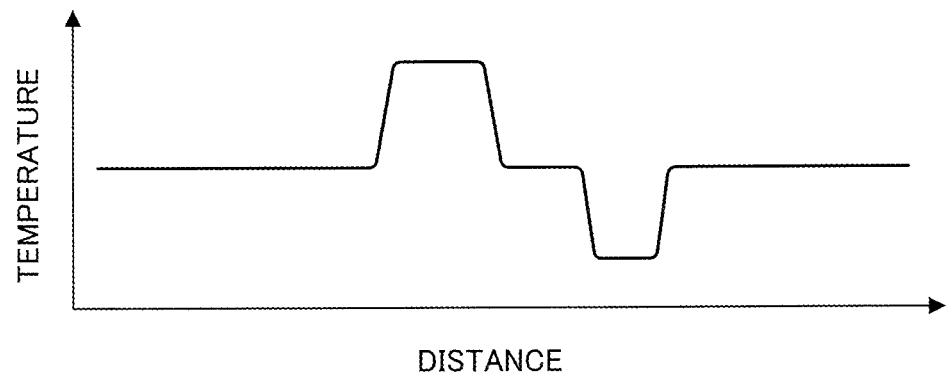
FIG. 5A ACTUAL TEMPERATURE DISTRIBUTION
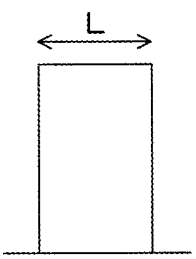
FIG. 5B MEASURED TEMPERATURE DISTRIBUTION
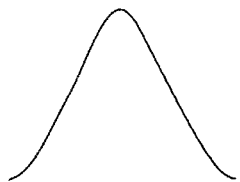

TEMPERATURE DISTRIBUTION MEASUREMENT SYSTEM, TEMPERATURE DISTRIBUTION MEASUREMENT APPARATUS, AND TEMPERATURE DISTRIBUTION MEASUREMENT METHOD

CROSS-REFERENCE TO RELATED APPLICATION

This application is a continuation of International Patent Application No. PCT/JP2011/069711 filed Aug. 31, 2011 and designated the U.S., the entire contents of which are incorporated herein by reference.

FIELD

The embodiments discussed herein are related to a temperature distribution measurement system, a temperature distribution measurement apparatus, and a temperature distribution measurement method which use an optical fiber.

BACKGROUND

In recent years, with the arrival of a high-level information society, a large amount of data is handled by computers. Many computers are often installed in the same room in an institution such as a data center and managed collectively. Under such circumstances, a large amount of heat is produced by the computers to cause malfunction or breakdown; therefore, means for cooling the computers is used. Thus, generally in a data center, fans are used to allow heat produced inside the computers to escape to the outside of the computers, and also, the temperature of the room is adjusted by an air conditioner.

Depending on the operation statuses of the computers, the amount of heat produced by the computers fluctuates. To prevention of heat-related malfunction or breakdown of the computers, it may be conceivable to, for example, use an air conditioner having cooling capacity corresponding to the maximum amount of heat produced by the computers and constantly operate the air conditioner at its maximum capacity. However, operating the air conditioner of high cooling capacity at its maximum capacity constantly is not preferable not only because it increases running costs, but also in view of energy saving and $CO_2$ reduction. For this reason, it is desired that air conditioning be controlled efficiently according to the amount of heat produced by each rack.

For efficient control of air conditioning, the temperature of each rack installed in the data center prefers to be measured in real time. It has conventionally been proposed to use an optical fiber as a temperature sensor for measuring a temperature distribution of an area having a plurality of heat sources, such as a data center.

Patent Document 1: Japanese Laid-open Patent Publication No. 2009-265077
Patent Document 2: Japanese Laid-open Patent Publication No. 2010-160081

SUMMARY

According to one aspect of the technique disclosed, provided is a temperature distribution measurement system including a laser light source optically connected to an optical fiber, a photodetector configured to detect light backscattered in the optical fiber, a temperature distribution measurement unit configured to perform correction calculation using a transfer function on a measured temperature distribution obtained from an output from the photodetector, and an actual temperature distribution measurement unit configured to measure an actual temperature distribution in a location where the optical fiber is laid. In the temperature distribution measurement system, the temperature distribution measurement unit determines appropriateness of the transfer function by computing a difference between the measured temperature distribution after the correction and the actual temperature distribution.

According to another aspect of the technique disclosed, provided is a temperature distribution measurement apparatus including a laser light source optically connected to an optical fiber, a photodetector configured to detect light backscattered in the optical fiber, and a temperature distribution measurement unit configured to perform correction calculation using a transfer function on a measured temperature distribution obtained from an output from the photodetector. In the temperature distribution measurement apparatus, the temperature distribution measurement unit acquires an actual temperature distribution in a location where the optical fiber is laid and determines appropriateness of the transfer function by computing a difference between the measured temperature distribution after the correction and the actual temperature distribution.

According to yet another aspect of the technique disclosed, provided is a temperature distribution measurement method including: inputting a measured temperature distribution obtained using an optical fiber into a temperature distribution measurement unit and correcting the measured temperature distribution by using a transfer function; inputting an actual temperature distribution in a location where the optical fiber is laid, into the temperature distribution measurement unit; causing the temperature distribution measurement unit to determine appropriateness of the transfer function through a comparison between the measured temperature distribution after the correction and the actual temperature distribution; and correcting the transfer function by using the measured temperature distribution before the correction and the actual temperature distribution when it is determined that the transfer function is inappropriate.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram illustrating results obtained by calculating an $I_1/I_2$ ratio for each time point based on the time-series distribution of the intensity of Raman scattered light in FIG. 3 and converting the horizon axis and the vertical axis in FIG. 3 into distance and temperature, respectively;

FIGS. 5A and 5B are diagrams illustrating a minimum heated length (part 1);

DESCRIPTION OF EMBODIMENTS

Before an embodiment is described, a prelude is given below to facilitate understanding of the embodiment.

An optical fiber has a low position resolution. Thus, in a place having a high density of temperature measured locations (measurement points), it is difficult to accurately and efficiently measure a temperature distribution with an optical fiber used as a temperature sensor. Thus, the inventors of the present application have proposed, in Patent Document 1 (Japanese Laid-open Patent Publication No. 2009-265077), Patent Document 2 (Japanese Laid-open Patent Publication No. 2010-160081), and the like, techniques for using a transfer function to correct a temperature distribution in a longitudinal direction of an optical fiber obtained by a temperature distribution measurement apparatus. This may enable accurate, efficient measurement of the temperatures at densely-arranged measurement points.

A transfer function changes not only in accordance with a distance from a light source (distance along a route in which an optical fiber is laid) or the entire length of the optical fiber, but also with time. Thus, it is preferable to evaluate the appropriateness of the transfer function not only when the laying condition of the optical fiber is changed, but also periodically, e.g., about once a year.

In the embodiment below, a description is given of a temperature distribution measurement system, a temperature distribution measurement apparatus, and a temperature distribution measurement method capable of easily evaluating the appropriateness of a transfer function.

Embodiment

Figure 1:
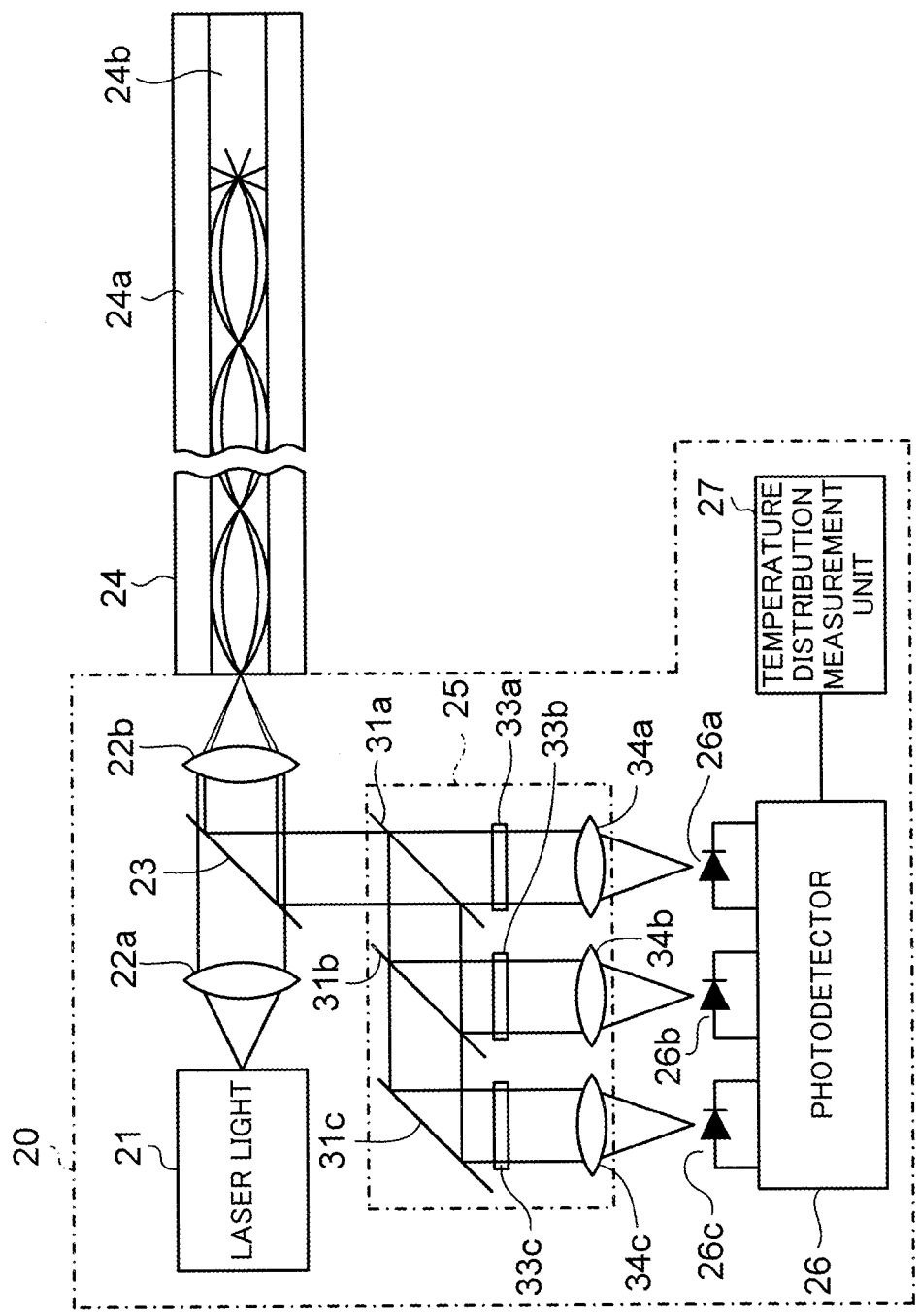
FIG. 1 is a schematic diagram illustrating the configuration of a temperature distribution measurement apparatus according to an embodiment.
Figure 2:
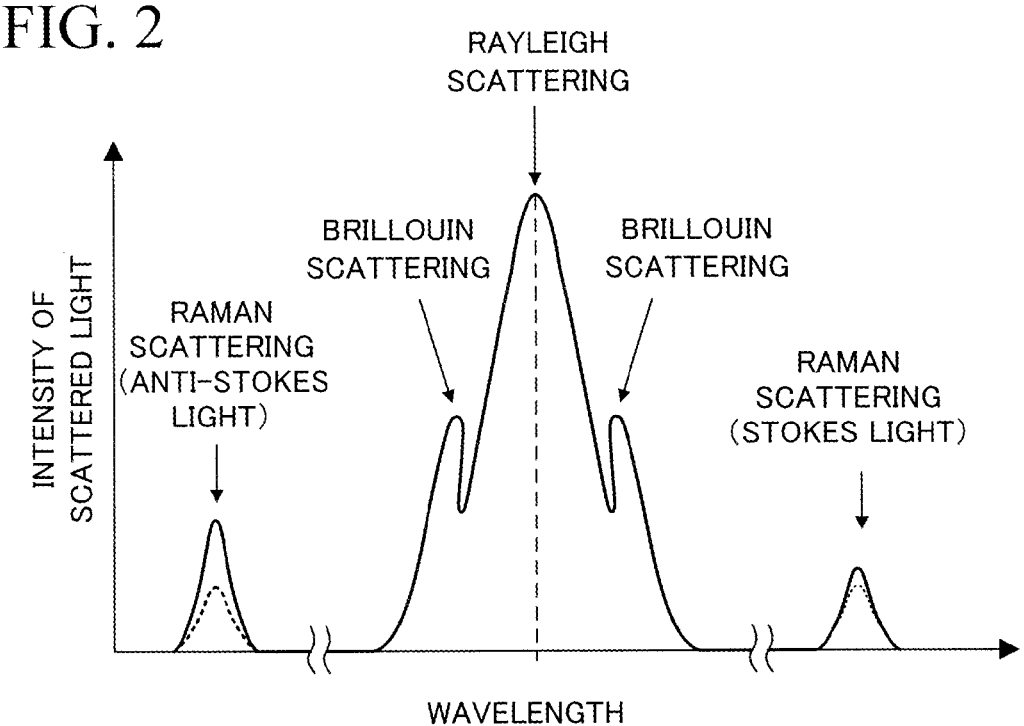
FIG. 2 is a diagram illustrating a spectrum of backscattered light.

FIG. 1 is a schematic diagram illustrating the configuration of a temperature distribution measurement apparatus according to an embodiment, and FIG. 2 is a diagram illustrating a spectrum of backscattered light.

As illustrated in FIG. 1, a temperature distribution measurement apparatus 20 according to this embodiment has a laser light source 21, lenses 22a, 22b, a beam splitter 23, a wavelength separation section 25, a photodetector 26, and a temperature distribution measurement unit 27, and is connected to an optical fiber 24 when used.

The laser optical source 21 outputs laser light of a predetermined pulse width at constant intervals. This laser light passes through the lens 22a, the beam splitter 23, and the lens 22b and enters the optical fiber 24 from a light-source-side end portion of the optical fiber 24. In FIG. 1, reference numeral 24a denotes a cladding of the optical fiber 24, and reference numeral 24b denotes a core of the optical fiber 24.

Part of the light entering the optical fiber 24 is backscattered by molecules constituting the optical fiber 24. The backscattered light includes, as illustrated in FIG. 2, Rayleigh scattered light, Brillouin scattered light, and Raman scattered light. The Rayleigh scattered light is light having the same wavelength as incident light, and the Brillouin scattered light and Raman scattered light are light whose wavelengths are shifted from that of the incident light.

Raman scattered light includes Stokes light whose wavelength is shifted toward a longer wavelength side of the incident light and anti-Stokes light whose wavelength is shifted toward a shorter wavelength side of the incident light. The shift amount of the Stokes light or the anti-Stokes light is generally about 50 nm, although it depends on the wavelength of the laser light and the substance forming the optical fiber 24 or the like. The intensity of each of the Stokes light and the anti-Stokes light changes according to temperature, and the Stokes light changes by a small amount due to temperature, while the anti-Stokes light changes by a large amount due to temperature. In other words, the Stokes light has low temperature dependency, and the anti-Stokes light has high temperature dependency.

As illustrated in FIG. 1, these types of backscattered light return in the optical fiber 24 and are emitted through the light-source-side end portion thereof. Then, the light passes through the lens 22b, is reflected by the beam splitter 23, and enters the wavelength separation section 25.

The wavelength separation section 25 has beam splitters 31a, 31b, 31c, optical filters 33a, 33b, 33c, and condenser lenses 34a, 34b, 34c. The beam splitters 31a, 31b, 31c either transmit or reflect light depending on the wavelength of the light. The optical filters 33a, 33b, 33c each transmit light of a particular wavelength, and the condenser lenses 34a, 34b, 34c condense light transmitted by the optical filters 33a, 33b, 33c into light receiving parts 26a, 26b, and 26c of the photodetector 26, respectively.

The light entering the wavelength separation section 25 is separated by the beam splitters 31a, 31b, 31c and the optical filters 33a, 33b, 33c into Rayleigh scattered light, Stokes light, and anti-Stokes light, and the separated light beams are inputted to the light receiving parts 26a, 26b, and 26c of the photodetector 26. As a result, the photodetector 26 outputs signals corresponding to the respective intensities of the Rayleigh scattered light, the Stokes light, and the anti-Stokes light.

The temperature distribution measurement unit 27 is configured with a computer. This temperature distribution measurement unit 27 obtains a temperature distribution along a route in which an optical fiber 24 is laid based on the signals outputted from the photodetector 26.

Figure 3:
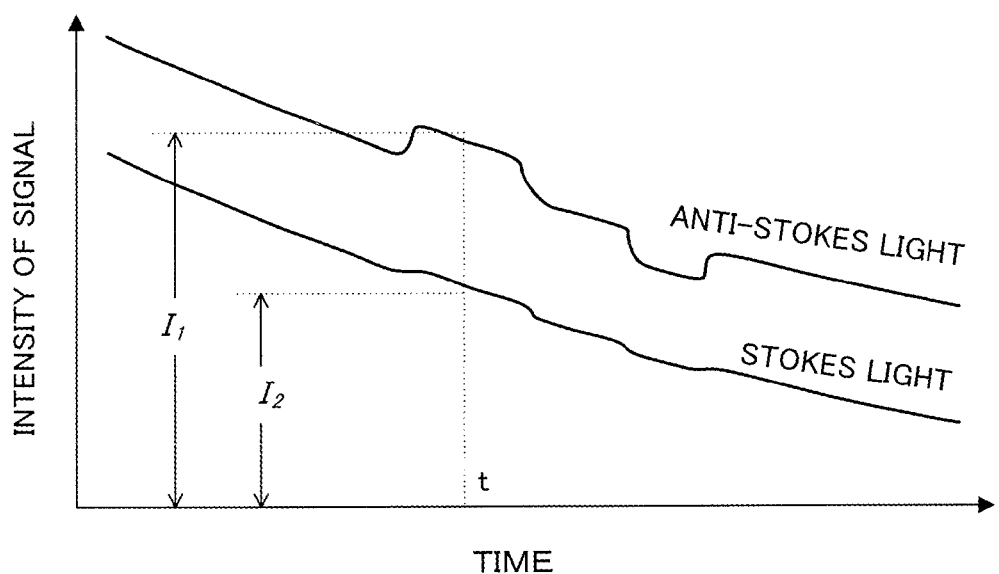
FIG. 3 is a diagram illustrating an example of a time-series distribution of the intensity of Raman scattered light.

FIG. 3 is a diagram illustrating an example of a time-series distribution of the intensity of Raman scattered light, in which the horizontal axis represents time and the vertical axis represents the intensity of the signal outputted from the light receiving part 26a, 26b, 26c of the photodetector 26. For a certain period of time immediately after a laser pulse enters the optical fiber 24, Stokes light and anti-Stokes light are detected by the photodetector 26. When the temperature is even throughout the entire length of the optical fiber 24, the signal intensity decreases with time from the time point when the laser pulse enters the optical fiber 24. In this case, the time on the horizontal axis represents a distance from the light-source-side end potion of the optical fiber 24 to a position where backscatter occurs, and a decrease in the signal intensity with time indicates light attenuation in the optical fiber 24.

When the optical fiber 24 does not have an even temperature throughout the entire length thereof but has, for example, a high-temperature area and a low-temperature area in its longitudinal direction, the signal intensities of the Stokes light and the anti-Stokes light are not uniformly attenuated, but a curve line of each of them representing a temporal change in the signal intensity has a peak and a valley, as illustrated in FIG. 3. In FIG. 3, $I_1$ and $I_2$ denote the intensities of anti-Stokes light and Stokes light, respectively, at a certain time point t.

FIG. 4 is a diagram illustrating results obtained by calculating an $I_1/I_2$ ratio for each time point based on the time-series distribution of the intensities of Raman scattered light in FIG. 3 and converting the horizon axis (time) and the vertical axis (signal intensity) in FIG. 3 into distance and temperature, respectively. As illustrated in FIG. 4, the temperature distribution in the longitudinal direction of the optical fiber 24 may be measured by calculating the intensity ratios ($I_1/I_2$) of the anti-Stokes light and the Stokes light.

Note that, although the intensity of the Raman scattered light (Stokes light and anti-Stokes light) at the position where the backscatter occurs changes depending on temperature, the intensity of Rayleigh scattered light is thought not to be dependent on temperature. Hence, it is preferable to identify the position of the backscatter based on the intensity of Rayleigh scattered light and correct the intensities of the Stokes light and the anti-Stokes light detected by the photodetector 26, according to the position thus identified.

Figure 6:
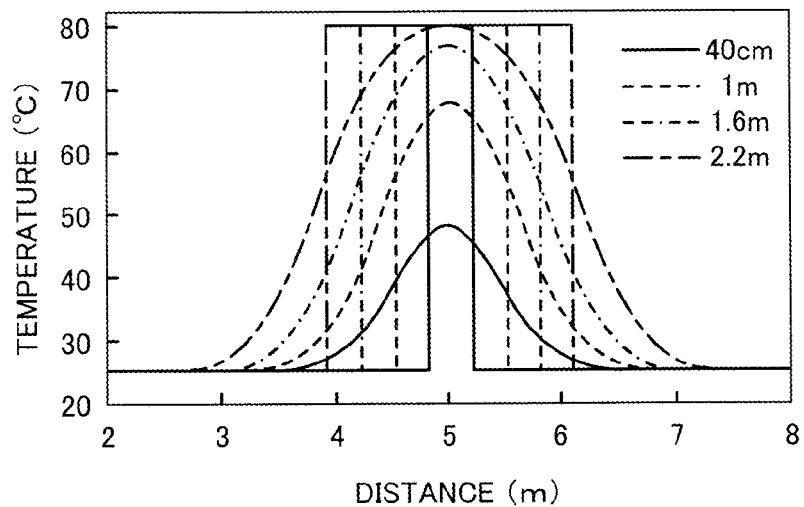
FIG. 6 is a diagram illustrating a minimum heated length (part 2)

With reference to FIGS. 5 and 6, a minimum heated length is described below.

Suppose here that a pulse width $t_0$ of laser light outputted from the laser light source 21 is 10 nsec, a speed c of light in vacuum is 3×10$^8$ m/sec, and a refractive index n of the core 24b of the optical fiber 24 is 1.5. In this case, a pulse width W of the laser light in the optical fiber 24 is about 2 m, as expressed in Formula (1) below.

[Expression 1]

$$W = t_0 \cdot c/n = 10(nsec) \cdot 3 \times 10^8 (m/sec)/1.5 \approx 2(m) \quad (1)$$

Backscattered light of the laser light of this pulse width is brought as one signal into the photodetector 26, and the photodetector 26 detects a temperature from an integrated value of signals for this pulse width. For this reason, the temperature is not accurately measured unless heat is evenly applied to the optical fiber for a length corresponding to the pulse width W. Hereinbelow, a minimum heated length for accurate temperature measurement is denoted as Lmin.

When the optical fiber 24 is heated with an actual temperature distribution illustrated in FIG. 5A, i.e., when a length L of the optical fiber 24 is evenly heated, the measured temperature distribution, as illustrated in FIG. 5B, exhibits a curve line like a Gaussian graph (normal distribution). A temperature distribution like the one illustrated in FIG. 5A is called a step-like temperature distribution.

FIG. 6 is a diagram illustrating a measured temperature distribution, in which the horizontal axis represents a longitudinal position in the optical fiber and the vertical axis represents a temperature. The optical fiber is placed under a temperature environment of 25° C., and heat of 80° C. is applied to acquire a step-like temperature distribution focusing around the position 5 m apart from the light source. Here, the lengths of heated portions are 40 cm, 1 m, 1.6 m, and 2.2 m. As be seen from FIG. 6, the observed peak of the measured temperature distribution is lower than the actual temperature when the length of the heated portion is shorter than 2 m (the minimum heated length Lmin), and the peak of the measured temperature distribution almost coincides with the actual temperature when the length of the heated portion is equal to or larger than 2 m.

Figure 7:
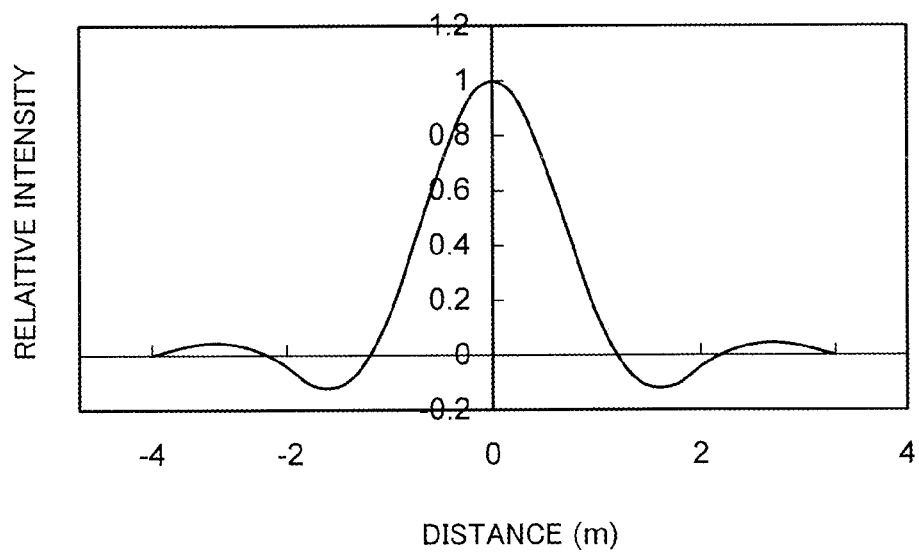
FIG. 7 is a diagram illustrating an example of a transfer function.

FIG. 7 is a diagram illustrating a transfer function (a transfer function of a temperature measurement system) in the temperature distribution in FIG. 6, in which the horizontal axis represents a distance from the heating center and the vertical axis represents a relative intensity. The measured temperature distribution in FIG. 6 is obtained by performing convolution of the transfer function in FIG. 7 on the step-like temperature distribution in FIG. 6. Conversely, a temperature distribution approximate to an actual temperature distribution (a corrected measured temperature distribution) is obtained by correcting (performing deconvolution on) the measured temperature distribution using an inverse function of the transfer function (inverse correction function). Note that the transfer function is almost equal to an impulse response property of the temperature measurement system (a temperature distribution measurement apparatus and the optical fiber).

The transfer function of the temperature measurement system changes depending on distance since the optical fiber 24 has group delay characteristics. For this reason, a single transfer function is not defined for the entire length of the optical fiber 24. However, a single transfer function may be defined for the same short distance in which loss or delay in an optical signal is considered uniform. For example, a transfer function is defined for every 1000 m based on experiments, and a transfer function to be used in correction may be selected according to a distance from the light source. The transfer function may be found from a measured temperature distribution obtained by heating the optical fiber in such a manner as to obtain a step-like temperature distribution as described earlier.

On the other hand, a temperature measurement point (simply called a "measurement point" hereinbelow) may be determined without considering the minimum heated length but considering the sampling frequency and the like of the measurement apparatus. In view of a practical measurement time period such as a time period for averaging in the measurement apparatus, the interval of the measurement points may be set to about 10 cm to 50 cm.

Figure 8:
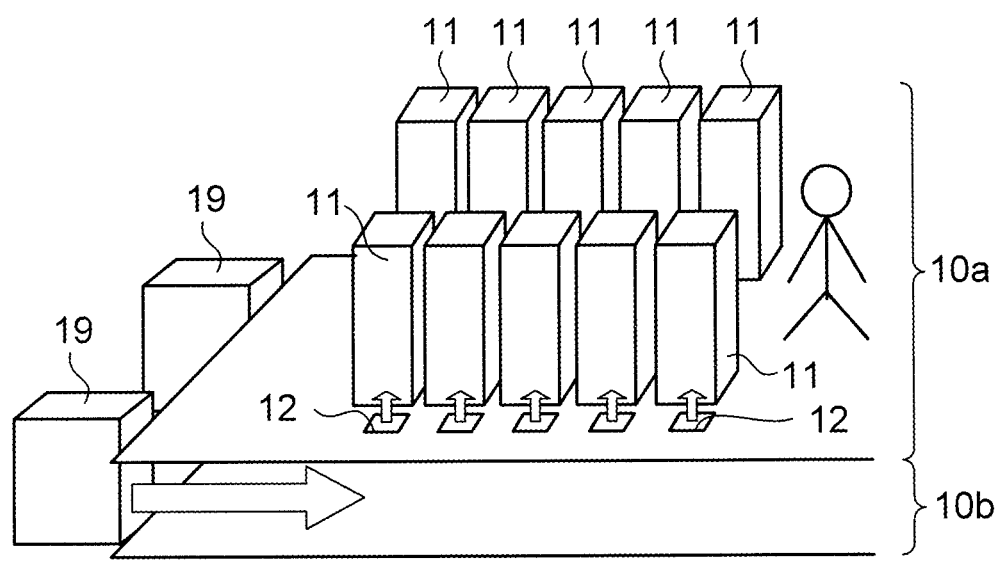
FIG. 8 is a schematic diagram illustrating a computer room in a data center.

FIG. 8 is a schematic diagram illustrating a computer room in a data center. As illustrated in FIG. 8, the computer room is divided into an equipment installed area 10a and a free-access floor 10b. A plurality of racks (server racks) 11 are placed in the equipment installed area 10a, and each rack 11 houses a plurality of computers (such as a blade server). The equipment installed area 10a is also provided with a route for a manager to walk through and a management space for managing the computers.

The free-access floor 10b is provided under the floor of the equipment installed area 10a. On this free-access floor 10b, power cables, communication cables, and the like connected to the racks 11 are placed.

The temperature of the free-access floor 10b is maintained constant by cool air supplied from air conditioners 19. Ventilators (grilles) 12 are provided in the floor of the equipment installed area 10a, and cool air is fed from the free-access floor 10b to the front face sides (air suction sides) of the racks 11 via these ventilators 12 to cool the computers in the racks 11.

Figure 9:
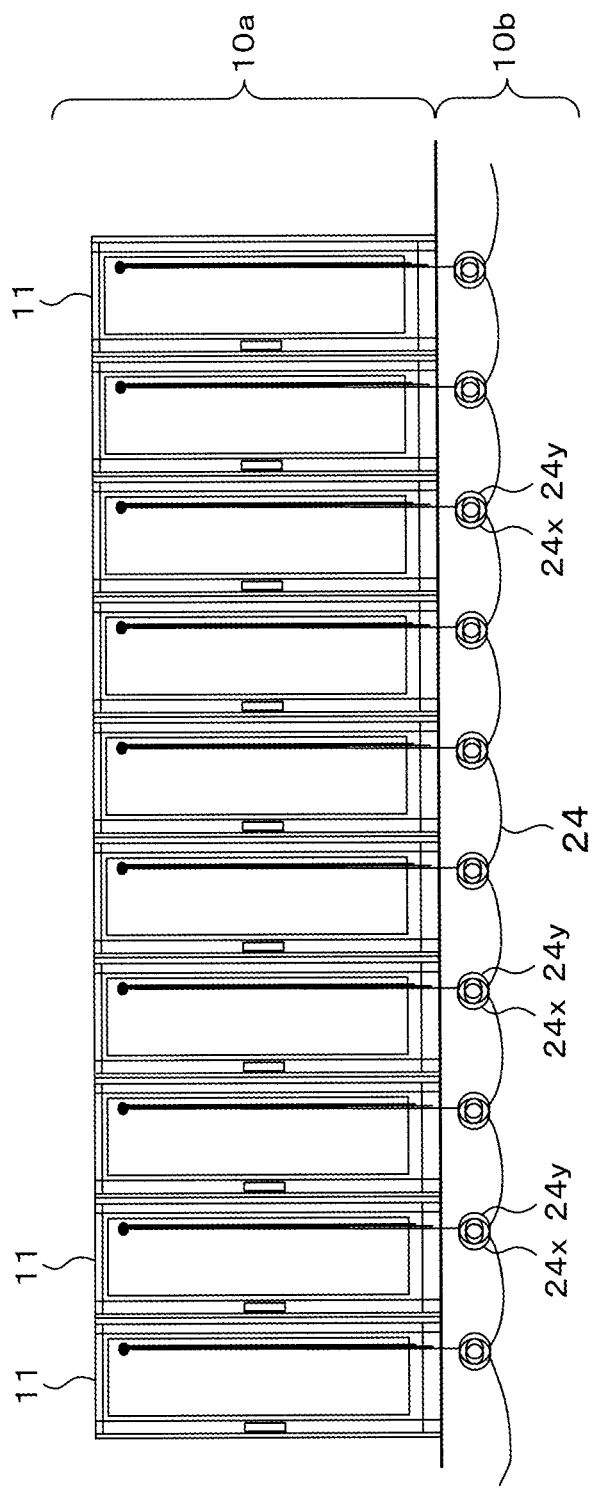
FIG. 9 is a diagram illustrating an example of how an optical fiber is laid.

FIG. 9 is a diagram illustrating an example of how the optical fiber 24 is laid. In this example, a winding portion 24x and a winding portion 24y are provided for each rack 11 and placed on the free-access floor 10b, the winding portions 24x, 24y each being formed by winding the minimum heated length Lmin or more of the optical fiber 24. A portion of the optical fiber 24 between the winding portion 24x and the winding portion 24y is laid to extend up and then down inside the rack 11.

When the optical fiber 24 of twice or more as long as the minimum heated length Lmin is placed on the free-access floor 10b between the racks 11, the temperature distribution measurement apparatus may measure the actual temperature of the free-access floor 10b without being affected by the internal temperature of the rack 11. In addition, the internal temperature of the rack 11 does not fall below the temperature of the free-access floor 10b.

Under such conditions, a distribution of the temperature inside the rack 11 may be accurately obtained by correcting a temperature measured at each measurement point in the rack 11, based on the measured temperature of the free-access floor 10b (see Patent Documents 1 and 2).

Figure 10:
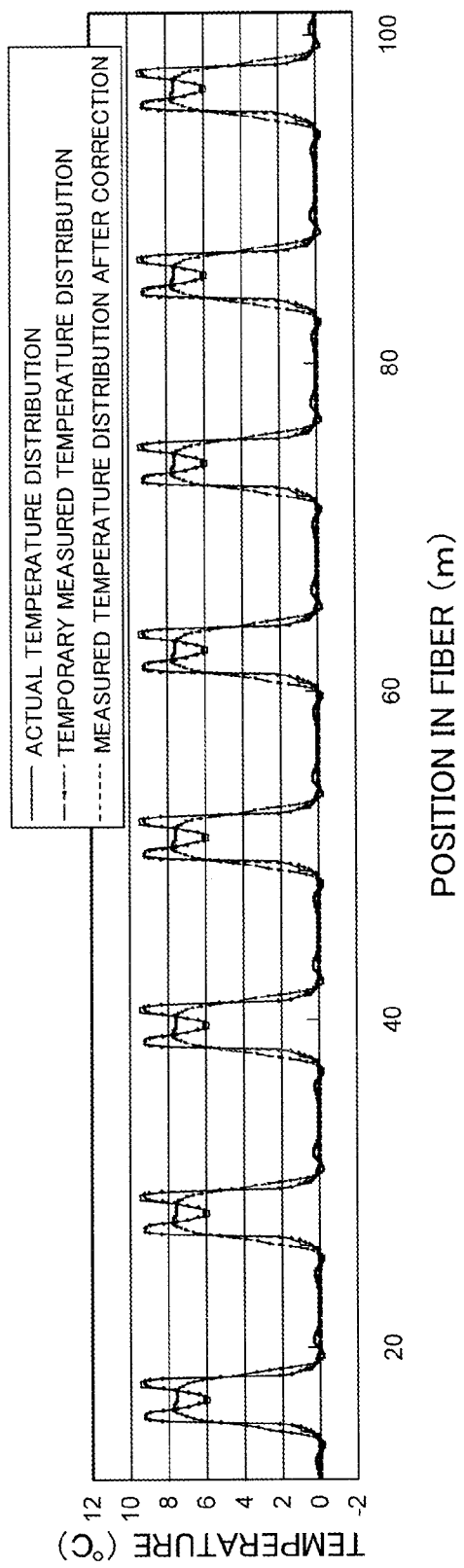
FIG. 10 is a diagram illustrating an actual temperature distribution, a temporary measured temperature distribution, and a measured temperature distribution after correction.

FIG. 10 illustrates an actual temperature distribution, a temporary measured temperature distribution, and a measured temperature distribution after correction. Here, the actual temperature distribution indicates an actual temperature at each measurement point, the temporary measured temperature distribution is a temperature distribution obtained by the ratios of Stokes light and anti-Stokes light (a temperature distribution before correction), and the measured temperature distribution after correction is a temperature distribution obtained by performing correction calculation on the temporary measured temperature distribution by use of a transfer function.

It is seen from FIG. 10 that the measured temperature distribution after correction almost coincides with the actual temperature distribution. Note that the temperature on the vertical axis in FIG. 10 is the difference from the temperature of the free-access floor 10b as a reference temperature.

As described earlier, a transfer function changes not only in accordance with a distance from the light source or the entire length of an optical fiber, but also with time. Thus, in this embodiment, a method described below is used to evaluate, when appropriate, whether a transfer function is appropriate or not and correct the transfer function when the result is negative.

Figure 11:
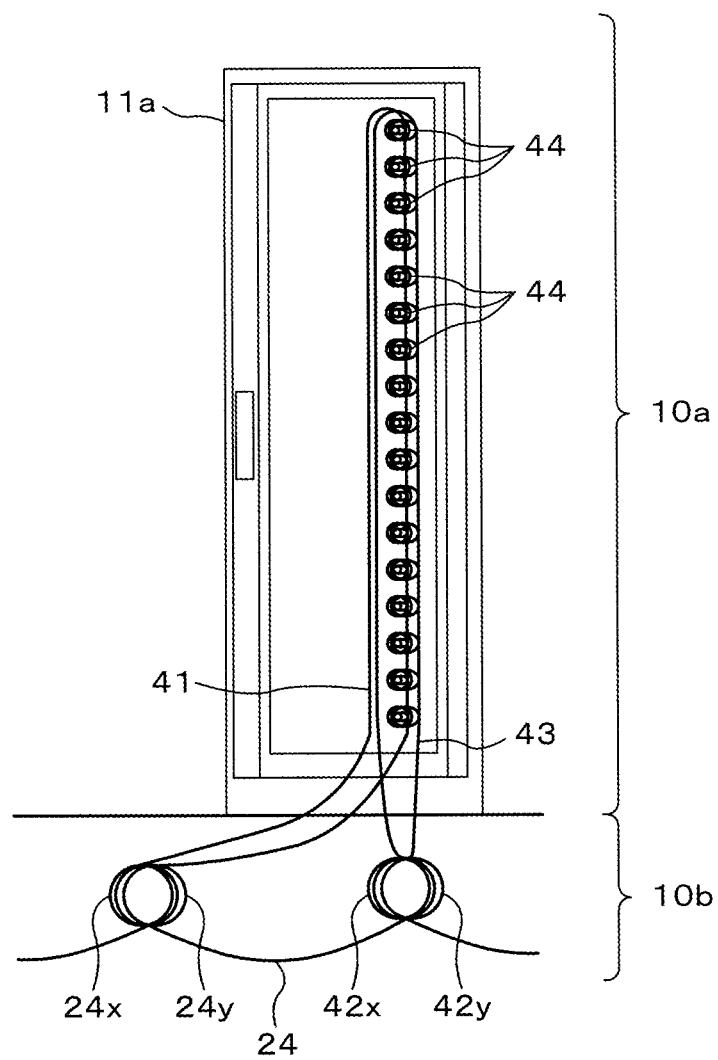
FIG. 11 is a diagram illustrating an example of how an optical fiber is laid, in a temperature distribution measurement method according to the embodiment.

FIG. 11 is a diagram representing an example of how an optical fiber is laid in the temperature distribution measurement method according to this embodiment. The following description assumes that the temperature distribution measurement apparatus 20 (see FIG. 1) sets measurement points at 10-cm intervals along the route in which the optical fiber is laid.

In this embodiment, a rack in which an optical fiber is laid as illustrated in FIG. 11 is placed for every, e.g., fifty to a hundred racks 11 or every 1000 m to 2000 m along the route in which the optical fiber is laid. Hereinbelow, the rack in which an optical fiber is laid as illustrated in FIG. 11 is referred to as a transfer-function evaluation rack 11a. A plurality of computers for job execution are housed in the transfer-function evaluation rack 11a, as they are in the other ranks 11.

The winding portions 24x, 24y as well as winding portions 42x, 42y each formed by winding the minimum heated length Lmin or more of the optical fiber 24 are placed on the free-access floor 10b below the transfer-function evaluation rack 11a. Then, a portion of the optical fiber 24 between the winding portions 24x, 24y is laid to extend up and then down inside the transfer-function evaluation rack 11a, as it is in the other racks 11 (see FIG. 9). Here, the portion of the optical fiber between the winding portions 24x, 24y drawn out to the inside of the transfer-function evaluation rack 11a is referred to as a temperature-distribution measurement optical fiber 41. The winding portions 24x, 24y are an example of a reference-temperature measurement winding portion.

A portion of the optical fiber 24 between the winding portions 42x, 42y is also laid to extend up and then down inside the transfer-function evaluation rack 11a. Hereinbelow, the portion of the optical fiber between the winding portions 42x, 42y drawn out to the inside of the transfer-function evaluation rack 11a is referred to as a transfer-function evaluation optical fiber 43.

The transfer-function evaluation optical fiber 43 is provided with a plurality of winding portions 44 each formed by winding the minimum heated length Lmin or more of the optical fiber. These winding portions 44 are arranged in a height direction of the transfer-function evaluation rack 11a. In this embodiment, the winding portions 44 are arranged at 10-cm intervals in the height direction of the transfer-function evaluation rack 11a. The winding portions 44 are an example of an actual-temperature measurement winding portion.

Figure 12A:
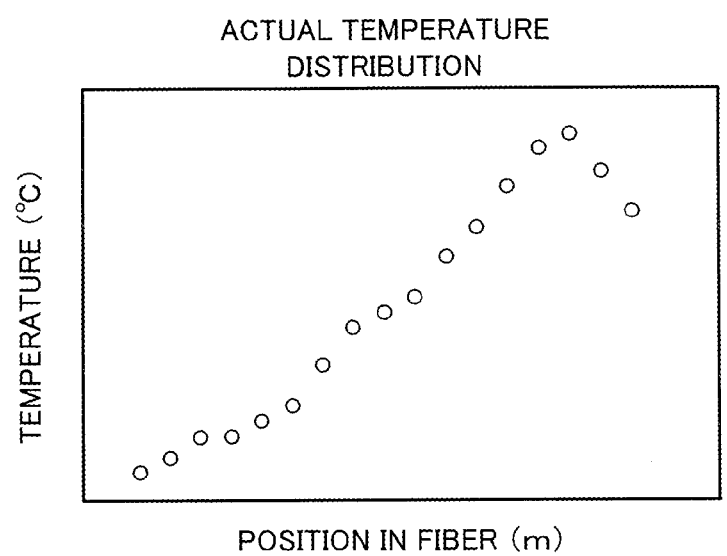
FIG. 12A is a diagram illustrating an example of a temperature distribution inside a rack obtained with winding portions.

By placing the winding portions 44, each formed by winding the minimum heated length Lmin or more of the optical fiber, at a plurality of locations inside the transfer-function evaluation rack 11a as illustrated in FIG. 11, a temperature distribution inside the transfer-function evaluation rack 11a may be found almost exactly without using a transfer function. FIG. 12A is a diagram illustrating an example of a temperature distribution inside the rack obtained with the winding portions 44. Herein, the temperature distribution inside the rack obtained with the winding portions 44 is referred to as an actual temperature distribution.

Figure 12B:
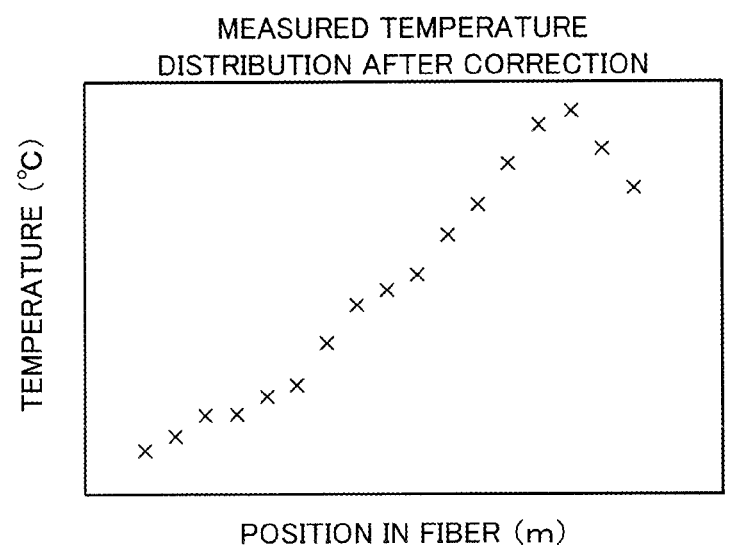
FIG. 12B is a diagram illustrating an example of a measured temperature distribution after correction.

To find the actual temperature distribution from a temperature distribution obtained from the temperature-distribution measurement optical fiber (a temporary measured temperature distribution), the measurement values prefer to be corrected using a transfer function. FIG. 12B is a diagram illustrating an example of a measured temperature distribution after correction.

If the measured temperature distribution after correction almost matches the actual temperature distribution, then it may be said that the transfer function used for the correction is appropriate. If, on the other hand, the measured temperature distribution after the correction is different from the actual temperature distribution by a certain amount or more, it is determined that the transfer function used for the correction is inappropriate. In this case, the transfer function prefers to be corrected.

Figure 13:
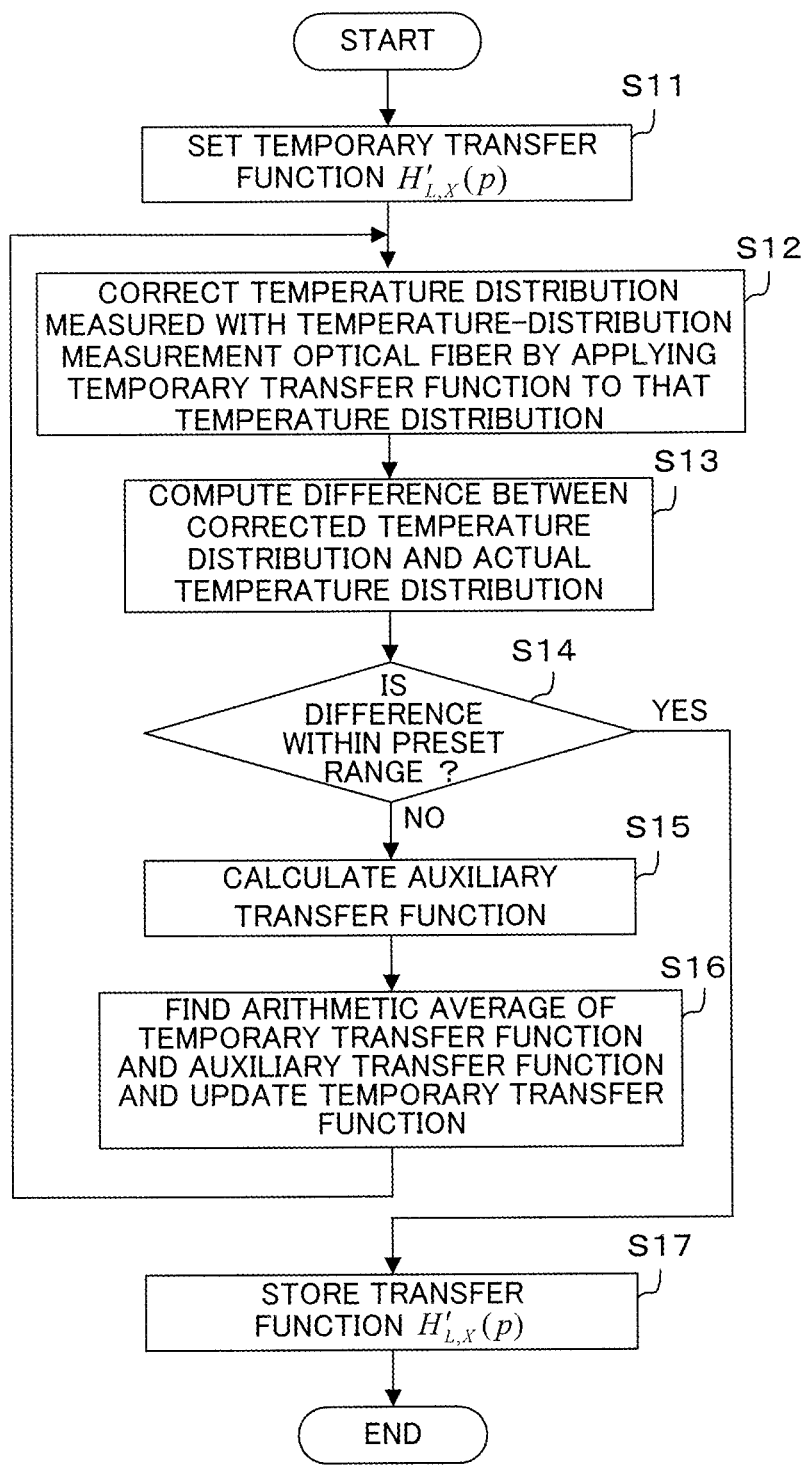
FIG. 13 is a flowchart illustrating a method for evaluating a transfer function and a method for correcting the transfer function.

With reference to a flowchart in FIG. 13, a description is given below of a method for evaluating a transfer function and a method for correcting the transfer function. The following description assumes that a transfer function for each position of the transfer-function evaluation rack 11a is stored in advance in the temperature distribution measurement unit 27 and that the following processing is performed for each transfer-function evaluation rack 11a.

Figure 14:
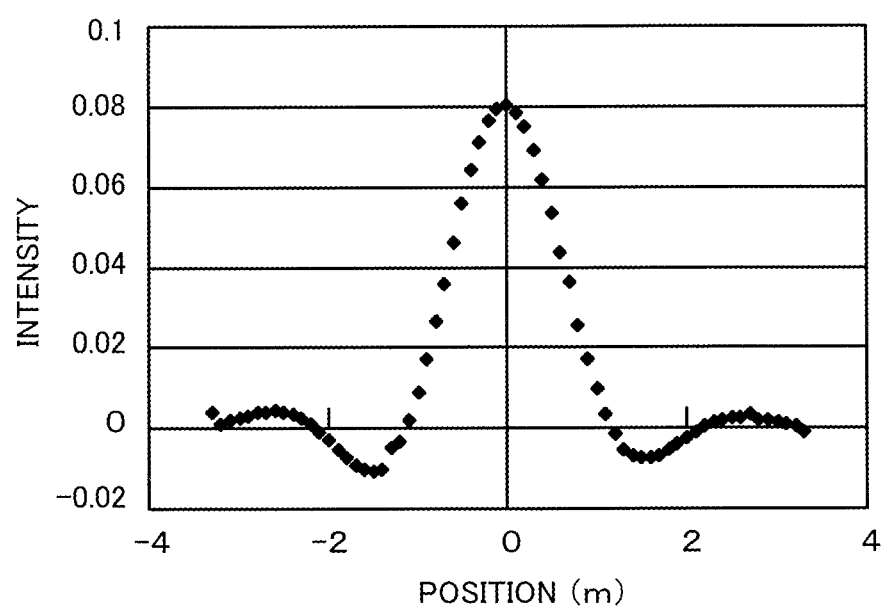
FIG. 14 is a diagram illustrating an example of a transfer function $H'_{L,x}(p)$.

First, in Step S11, the temperature distribution measurement unit 27 retrieves a transfer function for the position of the target transfer-function evaluation rack 11a from the transfer functions stored therein in advance, and sets the transfer function as a temporary transfer function $H'_{L,X}(p)$. FIG. 14 is a diagram illustrating an example of the transfer function $H'_{L,X}(p)$. Here, the indices L, X indicate that the transfer function is for a position X (a position X m away from the light-source-side end portion) in an optical fiber having an entire length L. Further, (p) indicates each component (dot in FIG. 14) constituting the transfer function.

Next, in Step S12, the temperature distribution measurement unit 27 corrects a temperature distribution measured with the temperature-distribution measurement optical fiber 41 (a temporary measured temperature distribution) by applying the temporary transfer function $H'_{L,X}(p)$ thereto.

Next, proceeding to Step S13, the temperature distribution measurement unit 27 computes a difference between the measured temperature distribution after the correction and an actual temperature distribution obtained with the winding portions 44. Then, in FIG. 14, the temperature distribution measurement unit 27 determines whether the difference between the temperature distributions is within a preset range. In this embodiment, the difference between the temperature distributions is calculated by finding an integrated value of square values of the temperature differences between the measurement points (the sum of squared errors). Alternatively, the difference between the temperature distributions may be calculated by finding the maximum value of the temperature differences between the measurement points or the difference between the peak values of the respective temperature distributions.

If the determination result in Step S14 is YES, i.e., it is determined that the difference between the measured temperature distribution after the correction and the temperature distribution obtained with the winding portions 44 is within the preset range, the processing proceeds to Step S17 in which the temporary transfer function $H'_{L,X}(p)$ is stored in the temperature distribution measurement unit 27 as a transfer function to be used in correcting a measured temperature distribution.

If, on the other hand, the determination result in Step S14 is NO, the processing proceeds to Step S15 in which an auxiliary transfer function H is calculated according to Formula (2) below using measurement values at the measurement points obtained with the temperature-distribution measurement optical fiber 41 and the transfer-function evaluation optical fiber 43.

[Expression 2]

$$H = ([X]^t [X])^{-1} [X]^t y \qquad (2)$$

In Formula (2), [X] denotes data on each measurement point of the transfer-function evaluation optical fiber 43, and y denotes pre-corrected data on each measurement point of the temperature-distribution measurement optical fiber 41. In addition, $[X]^t$ is the transposed matrix of [X].

The auxiliary transfer function H is a function approximate to a true transfer function, as will be described later. It may be conceivable to store this auxiliary transfer function H in the temperature distribution measurement unit 27 as the transfer function to be used in correcting a measured temperature distribution. However, a true transfer function is one measured by heating the optical fiber to obtain a step-like temperature distribution as illustrated in FIG. 5. In contrast, the auxiliary transfer function H is one found based on measurement values for the measurement points obtained with the temperature-distribution measurement optical fiber 41 and the transfer-function evaluation optical fiber 43, and is therefore possibly deviated from the true transfer function.

Thus, in this embodiment, to make the auxiliary transfer function H approximate the true transfer function, in Step S16 an arithmetic average between the temporary transfer function $H'_{L,X}(p)$ and the auxiliary transfer function H is found, and set as a new temporary transfer function $H'_{L,X}(p)$. Thereafter, the processing proceeds back to Step S12 and continues. The series of processing described above is repeated until the result in Step S14 is YES.

A description is given below a temporary transfer function $H'_{L,X}(p)$.

Generally, a transfer function h may be represented as Formula (3) below.

[Expression 3]

$$h = \{h_j\}_{j=0}^{j=J} \qquad (3)$$

In Formula (3), $h_j$ denotes a j-th component of the transfer function h.

A measured temperature distribution (temporary measured temperature distribution) may be represented by Formula (4) below.

[Expression 4]

$$y = \{y_k\}_{k=0}^{k=\infty} \qquad (4)$$

In Formula (4), the index k in a component $y_k$ denotes a k-th measurement point along the route in which the optical fiber is laid, and the component $y_k$ is a value obtained by subtracting the temperature of the free-access floor as the reference temperature from a temperature measurement value at the k-th measurement point.

Further, an actual temperature distribution may be represented by Formula (5) below.

[Expression 5]

$$x = \{x_i\}_{i=0}^{i=\infty} \qquad (5)$$

In Formula (5), as it is in Formula (4), the index i in a component $x_i$ denotes an i-th measurement point, and the component $x_i$ is a value obtained by subtracting the temperature of the free-access floor as the reference temperature from an actual temperature at the i-th measurement point $_i$.

Then, the measured temperature distribution y may be represented by Formula (6) below as the convolution of the actual temperature distribution x and the transfer function h.

[Expression 6]

$$y_k = \sum_{i=0}^{\infty} h_{k-i} x_i \qquad (6)$$

Note that a range of i is a range satisfying that the index k−i is equal to zero or more.

Formula (6) may be represented for each component as Formula (7) below.

[Expression 7]

$$\left. \begin{array}{l} y_0 = h_0 x_0 \\ y_1 = h_0 x_1 + h_1 x_0 \\ y_2 = h_0 x_2 + h_1 x_1 + h_2 x_0 \end{array} \right\} \qquad (7)$$

According to Formula (7), each component $h_j$ of the transfer function h may be calculated by making Formula (7) a system of equations for $h_j$ and using the least-square method or the like.

In Formula (6), when an area having a temperature change is focused on, areas before and after the area are areas in the free-access floor which have no temperature change, and values of their components $x_i$, $y_k$ are zero. Thus, they are not used in the calculation of Formula (6). For this reason, a column vector of components in Formula (5) except for all the zero components before and after a focused area having a temperature change is represented as in Formula (8) below.

[Expression 8]

$$x = (x_0, x_1, x_2, \ldots, x_n)^t \quad (8)$$

Further, as for the measured temperature distribution, similarly, since values of components of areas having no temperature change are zero and therefore not used in the calculation, a column vector of components in Formula (4) except for all the zero components before and after a focused area having a temperature change is represented as in Formula (9) below.

[Expression 9]

$$y = (y_0, y_1, y_2, \ldots, y_m)^t \quad (9)$$

The numbers of the components of the column vectors of Formula (8) and Formula (9) are m+1 and n+1, respectively, and m+1 is larger than n+1. This is because the measured temperature distribution spreads more laterally than the actual temperature distribution (see FIG. 6) and therefore has more non-zero components.

When the actual temperature distribution x and the measured temperature distribution y are represented as finite-dimensional column vectors as in Formula (8) and Formula (9), and Formula (7) is represented in the form of Formula (10), [X] is formed based on the actual temperature distribution x and has a finite number of components, specifically, (m+1)×(j+1) components.

[Expression 10]

$$y = [X]h \quad (10)$$

Note that the dimensions of the column vectors y, h in Formula (10) are finite dimensions as in Formula (8) and Formula (3).

In Formula (10), components $y_i$ of y are m+1 values obtained by temperature measurement, and [X] may be regarded as a coefficient matrix of (m+1)×(j+1) for a system of equations. Generally, m and j do not match. Hence, this system of equations is not uniformly solved for h.

Thus, in this embodiment, a sum e of squared errors as in Formula (11) below is considered.

[Expression 11]

$$e = \|y - [X]H\|^2 = (y - [X]H)^t(y - [X]H) \quad (11)$$

Note that a column vector H in Formula (11) is a (j+1)-dimensional vector having components as in Formula (12) below.

[Expression 12]

$$H = (H_0, H_1, H_2, \ldots, H_j)^t \quad (12)$$

A distribution H making e in Formula (11) small also approximately satisfies Formula (10). Then, the smaller the e in Formula (11) is, the more accurate the approximation becomes, making the distribution H approximate the true transfer function h.

In this embodiment, in contrast to the true transfer function, the distribution H is referred to as a corrected transfer function. According to this, Formula (11) may be said to be a formula for calculating the squared error e between the measured temperature distribution y and the temperature distribution obtained by the convolution of the corrected transfer function H on the actual temperature distribution x.

To find a corrected transfer function H with which the squared error e becomes as small as possible, a gradient vector ∂e/∂H of the squared error e is calculated according to Formula (13) below using Formula (11).

[Expression 13]

$$\frac{\partial e}{\partial H} = \begin{bmatrix} \frac{\partial e}{\partial H_0} \\ \frac{\partial e}{\partial H_1} \\ \vdots \\ \frac{\partial e}{\partial H_j} \end{bmatrix} \quad (13)$$

$$= \frac{\partial}{\partial H}\|y - [X]H\|^2$$

$$= -2[X]^t(y - [X]H)$$

$$= -2([X]^t y - [X]^t[X]H)$$

Determining each component $H_j$ of the auxiliary transfer function H to make this gradient vector ∂e/∂H zero is the least-square method. Formula (2) described earlier is obtained by rearranging Formula (13) for H with the right side thereof being zero. Note that slightly increasing a diagonal component of $[X]^t[X]$ in Formula (2) in view of noise in measurement suppresses amplification of a high-frequency component of noise and thus increases margin tolerance.

In this embodiment, as described thus far, the transfer-function evaluation rack 11a is placed, and inside the transfer-function evaluation rack 11a, the temperature-distribution measurement optical fiber 41 and the transfer-function evaluation optical fiber 43 are laid. Then, the appropriateness of a transfer function is determined by a comparison between a measured temperature distribution corrected by use of the transfer function and an actual temperature distribution obtained with the transfer-function evaluation optical fiber 43, and the transfer function is corrected if it is determined as being inappropriate. Thereby, temperature distributions may be measured accurately for a long period of time.

In this embodiment, the transfer-function evaluation rack 11a prefers to be placed for every, for example, fifty to a hundred racks 11, and hence an increase in the length of the optical fiber used therefor due to the addition of the transfer-function evaluation optical fiber 43 may be minimized. Further, since the temperature-distribution measurement optical fiber 41 and the transfer-function evaluation optical fiber 43 are formed with a single optical fiber in this embodiment, an increase in the costs involved in the laying work and maintenance for the optical fiber may be suppressed.

Note that the processing for the transfer function evaluation and the transfer function correction described above may be initiated by the temperature distribution measurement unit 27 in response to a command from a worker, or may be initiated automatically by the temperature distribution measurement unit 27 according to a preset schedule.

Moreover, although the actual temperature distribution inside the rack 11a is measured using the transfer-function evaluation optical fiber 43 having the winding portions 44 in the above embodiment, the actual temperature distribution inside the rack 11a may be measured using a thermocouple, an IC temperature sensor, or the like. Furthermore, although this embodiment describes temperature distribution measurement for a computer room in a data center, the techniques disclosed herein may be applied to temperature distribution measurement in other institutions such as an office building or a factory.

All examples and conditional language recited herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A temperature distribution measurement system comprising:
   a laser light source optically connected to an optical fiber;
   a photodetector configured to detect light backscattered in the optical fiber;
   a temperature distribution measurement unit configured to perform correction calculation using a transfer function on a measured temperature distribution obtained from an output from the photodetector; and
   an actual temperature distribution measurement unit configured to measure an actual temperature distribution in a location where the optical fiber is laid, wherein
   the temperature distribution measurement unit determines appropriateness of the transfer function at specified time intervals by computing a difference between the measured temperature distribution after the correction and the actual temperature distribution, and,
   when determining that the transfer function is inappropriate, the temperature distribution measurement unit corrects the transfer function by using the measured temperature distribution before the correction and the actual temperature distribution.

2. The temperature distribution measurement system according to claim 1, wherein
   the temperature distribution measurement unit corrects the transfer function by finding an auxiliary transfer function from the measured temperature distribution before the correction and the actual temperature distribution and computing an arithmetic average of the auxiliary transfer function and the transfer function.

3. The temperature distribution measurement system according to claim 2, wherein
   the auxiliary transfer function H is calculated according to the following formula:

$$H=([X]^t[X])^{-1}[X]^t y,$$

where H denotes the auxiliary transfer function, [X] denotes a matrix of data on each measurement point measured by the actual temperature distribution measurement unit, and y denotes a matrix of pre-corrected data on each measurement point on the optical fiber.

4. The temperature distribution measurement system according to claim 1, wherein
   the actual temperature distribution measurement unit has actual-temperature measurement winding portions each formed by winding a part of the optical fiber.

5. The temperature distribution measurement system according to claim 1, wherein
   the optical fiber is laid in a rack in which a computer is housed.

6. The temperature distribution measurement system according to claim 1, wherein
   at a location where a temperature is maintained constant, the optical fiber has a reference-temperature measurement winding portion formed by winding a certain length or more of the optical fiber.

7. A temperature distribution measurement apparatus comprising:
   a laser light source optically connected to an optical fiber;
   a photodetector configured to detect light backscattered in the optical fiber; and
   a temperature distribution measurement unit configured to perform correction calculation using a transfer function on a measured temperature distribution obtained from an output from the photodetector, wherein
   the temperature distribution measurement unit acquires an actual temperature distribution in a location where the optical fiber is laid and determines appropriateness of the transfer function at specified time intervals by computing a difference between the measured temperature distribution after the correction and the actual temperature distribution, and,
   when determining that the transfer function is inappropriate, the temperature distribution measurement unit corrects the transfer function by using the measured temperature distribution before the correction and the actual temperature distribution.

8. The temperature distribution measurement apparatus according to claim 7, wherein
   the temperature distribution measurement unit corrects the transfer function by finding an auxiliary transfer function from the measured temperature distribution before the correction and the actual temperature distribution and computing an arithmetic average of the auxiliary transfer function and the transfer function.

9. The temperature distribution measurement apparatus according to claim 8, wherein
   the auxiliary transfer function H is calculated according to the following formula:

$$H=([X]^t[X])^{-1}[X]^t y,$$

where H denotes the auxiliary transfer function, [X] denotes a matrix of data on each measurement point of the actual temperature distribution, and y denotes a matrix of pre-corrected data on each measurement point on the optical fiber.

10. A temperature distribution measurement method comprising:
    inputting a measured temperature distribution obtained using an optical fiber into a temperature distribution measurement unit and correcting the measured temperature distribution by using a transfer function;
    inputting an actual temperature distribution in a location where the optical fiber is laid, into the temperature distribution measurement unit;

causing the temperature distribution measurement unit to determine appropriateness of the transfer function at specified time intervals through a comparison between the measured temperature distribution after the correction and the actual temperature distribution; and correcting the transfer function by using the measured temperature distribution before the correction and the actual temperature distribution when it is determined that the transfer function is inappropriate.

11. The temperature distribution measurement method according to claim 10, wherein the temperature distribution measurement unit corrects the transfer function by finding an auxiliary transfer function from the measured temperature distribution before the correction and the actual temperature distribution and computing an arithmetic average of the auxiliary transfer function and the transfer function.

12. The temperature distribution measurement method according to claim 11, wherein the auxiliary transfer function H is calculated according to the following formula:

$$H = ([X]^ت[X])^{-1}[X]^ت y,$$

where H denotes the auxiliary transfer function, [X] denotes a matrix of data on each measurement point of the actual temperature distribution, and y denotes a matrix of pre-corrected data on each measurement point on the optical fiber.

* * * * *